United States Patent [19]

Ouellette

[11] Patent Number: 4,915,332
[45] Date of Patent: Apr. 10, 1990

[54] PORTABLE POOL CUE HOLDER

[76] Inventor: Daniel P. Ouellette, 5184 Merle St., Las Vegas, Nev. 89119

[21] Appl. No.: 345,096

[22] Filed: Apr. 27, 1989

[51] Int. Cl.⁴ .......................................... F16M 11/38
[52] U.S. Cl. ..................................... 248/171; 211/172; 248/528
[58] Field of Search ............... 248/171, 170, 165, 166, 248/168, 169, 435, 188.7, 528, 519, 346, 158; 211/172; 273/23

[56] References Cited

U.S. PATENT DOCUMENTS

| 651,649 | 6/1900 | Brown | 248/169 X |
|---|---|---|---|
| 721,425 | 2/1903 | Clyde | |
| 979,626 | 12/1910 | Wolff | 248/171 X |
| 1,199,258 | 9/1916 | Ford | 248/171 |
| 1,955,773 | 4/1934 | Roth | 211/172 |
| 2,016,313 | 10/1935 | Brown | 211/172 |
| 2,262,216 | 11/1941 | Vunovich | 311/79 |
| 2,296,043 | 9/1942 | McClary | 248/188 |
| 2,542,137 | 2/1951 | Hanson | 248/171 |
| 3,464,664 | 9/1969 | Nugent | 248/435 |
| 3,632,073 | 1/1972 | Nakatani | 248/169 |
| 3,831,285 | 8/1974 | Vissing | 33/244 |

4,121,799 10/1978 Michlo .................................. 248/171

OTHER PUBLICATIONS

Individual Cue Stand, Joe Porper's Creative Inventions, unnumbered page, ©1987.

Primary Examiner—J. Franklin Foss
Attorney, Agent, or Firm—Quirk, Tratos & Roethel

[57] ABSTRACT

A portable pool cue holder comprises a hollow cylindrical member and a retractable support assembly which comprises a plurality of legs that are biased open by compression springs and hinged to an assembly head; a collar that is inserted over one end of the hollow member having slots which guide the legs' extension; an inner retaining plate for limiting the extension of the support assembly and an annular member which engages a ledge above the foot of each leg and prevents the longitudinal movement of the support assembly out of the opened end of the cylindrical member. At the collared end of the cylindrical member, a cap is pivotally attached to the end of the collar for closing one end of the holder and prohibiting extension of the support assembly when the holder is not in use.

59 Claims, 3 Drawing Sheets

PORTABLE POOL CUE HOLDER

BACKGROUND OF THE INVENTION

This invention relates to a portable pool cue holder and more particularly to a portable pool cue holder that holds the pool cue in an upright position.

All pool players, whether novice or professional, whether young or old, suffer from the dilemma of what to do with the pool cue (or stick) between turns. Generally, a pool player leans the pool cue against a wall, table, or chair, or places it across a chair. A pool cue leaning against a wall, table or chair, however, is in an inherently unstable physical position. Inevitably, the pool cue falls to the floor, causing nicks to the shaft of the pool cue or breaking the ferrules or tips of the cue. The problem with leaving a cue placed across the chair is that somebody eventually moves the cue and either places it where the player has to hunt for it, thereby delaying the game, or leans the cue up against the wall, a table or a chair, again subjecting the cue to possible damage from falling over. Moreover, pool cues leaned against a wall, table or chair may cause pool cue shafts to bend or bow which may lead to permanent cue disfigurement or an undesirable curvature in the cue shaft. Of course, a pool player could also simply hold onto his cue, but this inhibits the player's freedom of movement between turns.

It is an object of the present invention to provide an individual portable pool cue holder to keep the pool player's cue safe and secure in an upright position.

It is a feature of the present invention to provide a portable pool cue holder that comprises a hollow cylindrical body having a set of collapsible legs that will support the hollow cylindrical body in an upright position to permit a pool cue to be stored therein when not in use. Another feature of the present invention is to provide the collapsible legs with a retracted position within the hollow cylindrical body so that the pool cue holder can itself be easily stored when not in use. A hinged cap is also provided to close the end of the holder to prevent inadvertent extension of the legs.

It is an advantage of the present invention that the pool cue holder will provide a convenient and safe place to store the pool cue thus allowing the pool player complete freedom of movement when it is not the player's turn to shoot. Moreover, the present invention reduces the pool player's fear or concern that the cue will be moved, damaged or disfigured. An additional feature of the present invention is that the pool cue holder is made of durable, lightweight materials, is portable and is small enough to fit in the pool player's back pocket or in his pool cue case. A further advantage of the present invention is that it will protect the pool cue from nicks, broken ferrules, tips and misalignment, thereby extending the life and maintaining the value of the pool cue.

BRIEF SUMMARY OF THE INVENTION

The portable pool cue holder of the present invention comprises a hollow cylindrical member fitted with a hollow cylindrical collar at one end. A hinged cap is used to close one end of the member. The member also houses a retractable support assembly comprising a plurality of legs. Each leg of the assembly is pivotally joined to an assembly head and biased open by a compression spring. When the support assembly is extended, the legs spread apart through, and as far as, slots in the collar of the member will allow. The support assembly itself is held in place inside the collared end of the cue holder by a retainer plate inside the collar. An annular member is mounted on the side of the retainer plate facing into the member. When the support assembly is retracted into the cue holder, a small step above the foot of each leg engages a latching ring, thereby preventing the support assembly from falling out of the open end of the member. When the cap is closed, any extension of the support assembly through the collared end of the member is prevented.

DETAILED DESCRIPTION OF THE PREFERRED EMBODIMENTS

Figure 1:
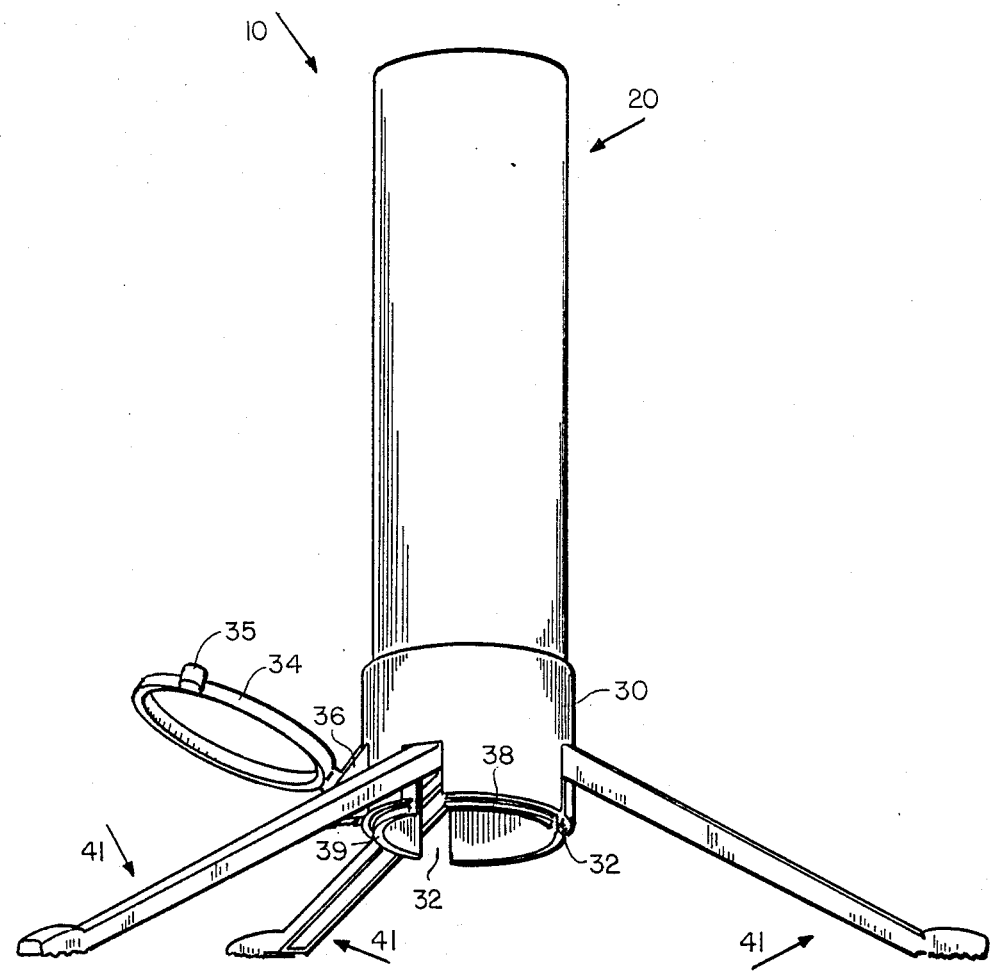
FIG. 1 shows an upwardly looking perspective view of the portable pool cue holder of the present invention.

The portable pool cue holder 10 of the present invention is shown generally in FIG. 1. The portable pool cue holder 10 includes a hollow cylindrical member 20 designed to accommodate the handle end of a pool cue for storage when the cue is not in use. The inner diameter of the hollow cylindrical member 20 is generally larger than the outer diameter of the handle portion of the pool cue, and is preferably only slightly larger than the diameter of the handle of the pool cue so that the pool cue will not wobble when placed in the pool cue holder 10.

At the lower end of the hollow cylindrical member 20 there is a hollow cylindrical collar 30 that is preferably integrally joined or integrally molded to the hollow cylindrical member 20. The collar 30 has a plurality of collar slots 32 through which the legs 41 of the retractable support assembly 40 extend. In the preferred embodiment of the invention shown in FIG. 1, the number of collar slots 32 used is three which corresponds to the number of legs 41 on the supporting assembly. If it is desired to use more than three legs 41 on the supporting assembly, then more collar slots 32 would also be used as there must be at least one collar slot 32 for each leg 41 of the supporting structure.

A cap 34, as shown in FIG. 1, is attached to the collar 30 by a hinge 36. The cap 34 may be provided with a spring (not shown) to bias the cap in an open position. The lower end of the collar 30 has a right angle bevel shaped rim 38 whose diameter matches the interior diameter of the cap 34. The rim 38 also has a retaining ridge 39 that creates a frictional grip on the inside of the cap 34 to hold the cap 34 securely closed. The frictional grip created by the retaining ridge 39 can be overcome so that the cap 34 can be opened by exerting force with a finger or thumb on the cap tab 35 mounted on the edge of the cap. The cap is shown in more complete detail in U.S. Pat. No. 3,831,285 (Vissing), which is incorporated herein by reference.

Figure 2:
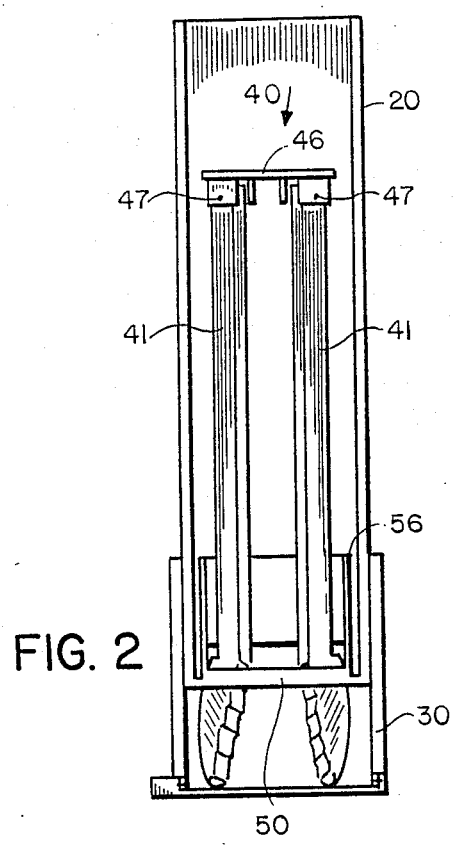
FIG. 2 is a cross-sectional view taken along the longitudinal axis of the portable pool cue holder showing the support assembly in the retracted position.
Figure 3:
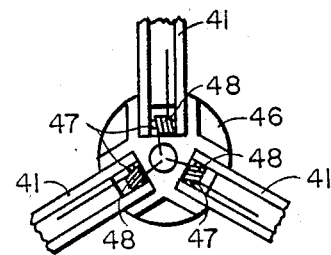
FIG. 3 is a end view of the retractable support assembly of the present invention shown in the extended position.

FIG. 2 shows the support assembly 40 retracted inside the holder 10. The support assembly 40, preferably a tripod arrangement, comprises an assembly head 46 and a plurality of legs 41. The legs 41 are pivotally attached to the assembly head 46. In the preferred embodiment, each leg 41 is hinged to the assembly head 46 by a pin 47. The pin 47 also retains a compression spring 48, as shown in FIG. 3, for each leg 41 that biases the leg 41 open or outwardly, i.e., the springs 48 spread the legs 41 away from each other to provide a stable base, as shown in FIG. 1, for supporting the hollow cylindrical member 20 and a pool cue stored therein.

Figure 4:
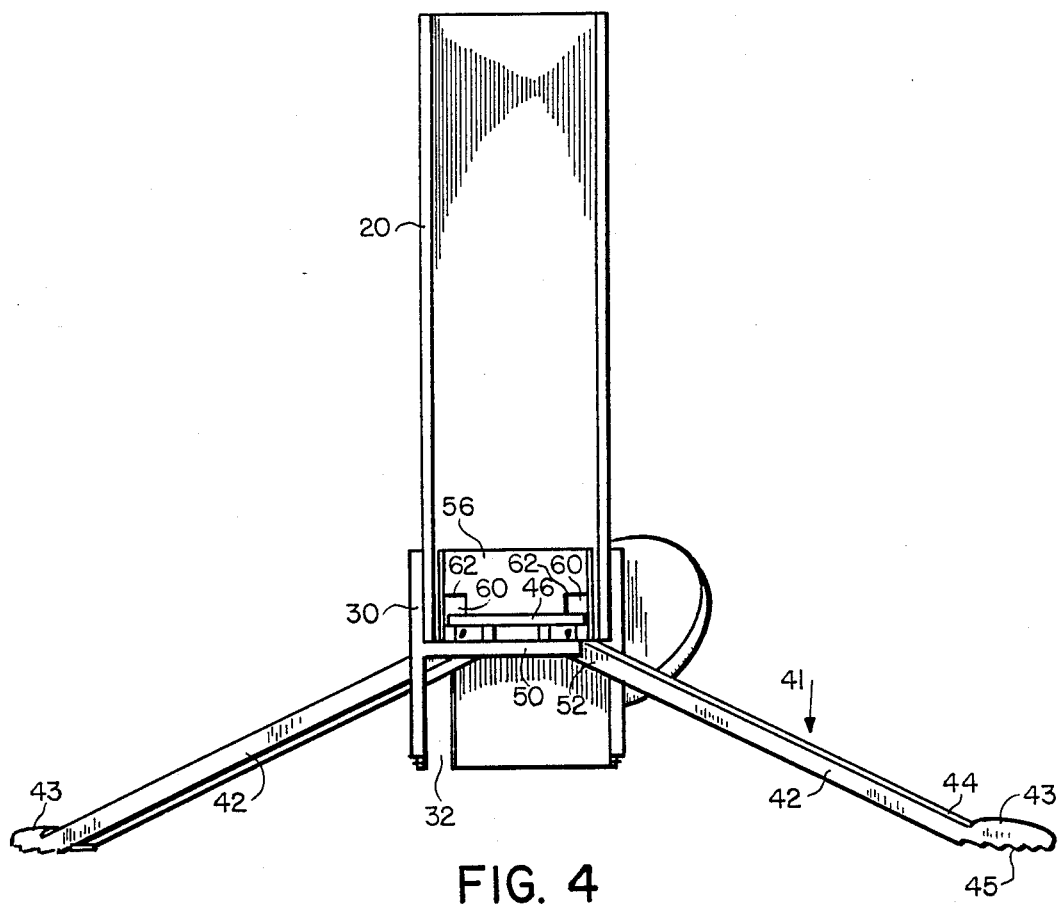
FIG. 4 is a cross-sectional view taken along the longitudinal axis of the portable pool cue holder with the legs of the support assembly extended.

As shown in FIG. 4, each leg 41 comprises a leg member 42 that terminates in a foot portion 43. The foot portion 43 is joined to the leg member 42 at an oblique angle. At this junction, a small ledge 44 is formed. The bottom of each foot 43 is provided with a gripping surface 45 to assist in providing stability to the assembly when it is in use. The gripping surface 45, in the preferred embodiment, is serrated, although other gripping means could be utilized.

Also shown in FIG. 2 and in FIG. 4 is the retaining plate 50. The retaining plate 50 is formed integrally within the interior of the collar 30 and includes an annular ring 56 that extends upwardly into the interior of the hollow member 20. In the preferred embodiment, the annular ring 56 is formed integrally with the retaining plate 50. The annular ring 56 acts as a guide for the support assembly head 46 when the support assembly 46 is lowered into the extended position as shown in FIG. 4. The assembly head 46 comes to rest on the top of the retaining plate 50 when the legs 41 are extended, thus limiting the downward movement of the support assembly. The retaining plate 50 is a solid piece but the plate 50 has circumferentially spaced plate slots 52 (one for each leg 41) that permit the legs 41 of the support assembly 40 to pass through the plate 50 when the legs 41 are extended. The annular ring 56 also has circumferentially spaced ring slots 60 that are aligned with the plate slots 52 to permit the legs 41 to extend outwardly.

When the support assembly 40 is retracted into the hollow member 20 of the holder 10, as shown in FIG. 2, the upward movement of each leg 41 is limited by the ledge 44 formed by the junction of the leg member 42 and the foot 43. The ledge 44 of each leg 41 engages the top 62 of each ring slot 60 in the annular ring 56. Each leg is outwardly biased by the action of the compression spring 48. As a consequence of the outward bias of each leg 41, the support assembly 40 is effectively held against further upward movement into the interior of the holder 10. As is also shown in FIG. 2, the support assembly 40 is prohibited from falling out of the collared end of the holder 10 by the cap 34 when it is closed.

In the operation of the present invention, the player opens the cap 34 and extends the support assembly 40 of the holder 10. This easily accomplished by a flick of the player's wrist which causes the support assembly to pop down out of the hollow member 10. The player places the holder 10 on the feet 43 of the support assembly 40 at its desired location, e.g. on the floor near the player's chair. The player inserts the handle portion of the cue into the hollow cylindrical member 20 of the pool cue holder 10. The cylindrical wall of the hollow member 20 provides the lateral support to keep the cue in an upright position and the retainer plate 50 and the annular ring 58 provide the vertical support. The fully extended legs 41 of the support assembly 40 provide the necessary balance to the holder 10 to keep the cue from falling over. Thus, the pool player's cue is safe and secure from nicks, broken ferrules or tips and misalignment, thereby extending the life and maintaining the value of the pool cue. When the holder 10 is not in use the player stores the support assembly 40 by squeezing the legs 41 together to overcome the bias of the springs and simply pushing the support assembly 40 into the interior of the hollow cylindrical member 20 and closing the cap 34. The distance which the support assembly 40 can be pushed into the hollow cylindrical member 20 is limited by the action of the ledge 44 against the top 62 of the ring slot 60.

Although the number of legs 41 of the retractable support assembly of the portable pool cue holder 10 of the present invention are not critical, in the preferred embodiment of this invention, there are three compression spring biased legs 41, and an equal number of collar slots 32, plate slots 52, and ring slots 60. In addition, although the dimensions of the portable pool cue holder 10 are not critical, in the preferred embodiment of this invention, the length of the hollow member 20 is 4 inches; the overall length of the holder 10 is 6 inches or less, most preferably 5 ¼ inches; the inner diameter of the hollow member 20 is 1 ⅜ inches, the outer diameter of the hollow member 20 is 1 ⅝ inches, the thickness of the wall of hollow member 20 is ⅛ inch and the weight of the holder 10 is approximately 5 ounces.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

What is claimed is:

1. A portable pool cue holder comprising:
    (a) a hollow member open at one end for receiving a pool cue to be held therein, and
    (b) a support assembly for supporting the hollow member in an upright position, and
    (c) a hollow collar attached to the lower end of the hollow member, and
    (d) a retaining plate attached to the interior of the hollow collar for retaining the support assembly within the hollow member, said retaining plate having a plurality of plate slots spaced around the periphery of the retaining plate and an annular ring attached to the retaining plate to guide the support assembly
whereby a pool cue inserted into the hollow member is maintained in the holder.

2. The portable pool cue holder as described in claim 1 wherein a plurality of circumferentially spaced collar slots are provided around the periphery of the hollow collar.

3. The portable pool cue holder as described in claim 1 wherein the annular ring has a plurality of ring slots spaced around the periphery of the annular ring.

4. The portable pool cue holder as described in claim 3 wherein the support assembly comprises a plurality of legs, each leg having a leg member and a foot portion, and a ledge formed at the junction of the leg member and the foot portion, said ledge cooperating with the ring slots in the annular ring to retain the support assembly within the hollow member when the support assembly is in a retracted position.

5. The portable pool cue holder as described in claim 3 wherein the hollow member, the hollow collar and the retaining plate are each cylindrical.

6. The portable pool cue holder as described in claim 1 wherein the hollow member and the hollow collar are both cylindrical.

7. The portable pool cue holder as described in claim 1 wherein the hollow member is cylindrical.

8. The portable pool cue holder as described in claim 1 wherein the support assembly comprises a plurality of legs.

9. The portable pool cue holder as described in claim 8 wherein the legs are attached to an assembly head adapted to be mounted within the hollow member.

10. The portable pool cue holder as described in claim 9 wherein the legs are attached to the assembly head by a pivot pin.

11. The portable pool cue holder as described in claim 10 wherein the pivot pin includes a spring that biases the legs toward an outward position.

12. The portable pool cue holder as described in claim 8 wherein each leg has a leg member and a foot portion.

13. The portable pool cue holder as described in claim 12 wherein the foot portion is joined to the leg member at an oblique angle.

14. The portable pool cue holder as described in claim 12 wherein the bottom of each foot portion is provided with a gripping surface.

15. The portable pool cue holder as described in claim 14 wherein the gripping surface is a serrated surface.

16. The portable pool cue holder as described in claim 1 wherein the support assembly is mounted within the hollow member.

17. The portable pool cue holder as described in claim 16 wherein the support assembly is movably mounted within the hollow member between a first retracted storage position and a second extended support position.

18. The portable pool cue holder as described in claim 16 wherein a cap is provided to close an end of the hollow member and retain the support assembly in the hollow member when the support assembly is in the retracted position.

19. The portable pool cue holder as described in claim 18 wherein the cap is pivotally mounted on the hollow member.

20. A pool cue holder comprising:
(a) means for receiving at least one end of a pool cue, and
(b) means for supporting the receiving means in an upright position whereby a pool cue inserted into the means for receiving is supported in the holder, and
(c) a hollow collar attached to the lower end of the receiving means, and
(d) a retaining plate having a plurality of plate slots spaced around the periphery of the retaining plate said retaining plate being attached to the interior of the hollow collar for retaining the supporting means within the receiving means.

21. The pool cue holder of claim 20 wherein the means for receiving is a hollow member open at one end.

22. The pool cue holder as described in claim 20 wherein a plurality of circumferentially spaced collar slots are provided around the periphery of the hollow collar.

23. The pool cue holder as described in claim 20 wherein the retaining plate has an annular ring attached thereto to guide the means for supporting.

24. The pool cue holder as described in claim 23 wherein the annular ring has a plurality of ring slots spaced around the periphery of the annular ring.

25. The pool cue holder as described in claim 21 wherein the means for supporting is a leg assembly.

26. The pool cue holder as described in claim 25 wherein the leg assembly comprises a plurality of legs.

27. The pool cue holder as described in claim 26 wherein each leg has a leg member and a foot portion.

28. The pool cue holder as described in claim 27 wherein the foot portion is joined to the leg member at an oblique angle.

29. The pool cue holder as described in claim 28 wherein the bottom of each foot portion is provided with a gripping surface.

30. The pool cue holder as described in claim 29 wherein the gripping surface is a serrated surface.

31. The pool cue holder as described in claim 20 wherein the supporting means is mounted within the receiving means.

32. The pool cue holder as described in claim 31 wherein the supporting means is movably mounted within the receiving means between a first retracted storage position and a second extended support position.

33. The pool cue holder as described in claim 32 wherein cap means is provided for closing the receiving means and for retaining the supporting means in the receiving means when the supporting means is in the retracted position.

34. The pool cue holder as described in claim 33 wherein the cap means is pivotally mounted on the receiving means.

35. The pool cue holder as described in claim 25 wherein the means for supporting is retractable within the hollow member.

36. The pool cue holder as described in claim 20 wherein the means for supporting is retractable within the means for receiving.

37. The pool cue holder as described in claim 20 wherein the means for supporting comprises a plurality of legs, each leg having a leg member and a foot portion, and a ledge formed at the junction of the leg member and the foot portion.

38. The pool cue holder as described in claim 20 wherein the means for receiving is cylindrical.

39. A portable pool cue holder comprising:
(a) a hollow member open at one end for receiving a pool cue to be held therein,
(b) a support assembly for supporting the hollow member in an upright position,
(c) a hollow collar attached to the lower end of the hollow member,
(d) a retaining plate attached to the interior of the hollow collar for retaining the support assembly within the hollow member whereby a pool cue inserted into the hollow member is maintained in the holder.

40. The portable pool cue holder as described in claim 39 wherein a plurality of circumferentially spaced collar slots are provided around the periphery of the hollow collar.

41. The portable pool cue holder as described in claim 39 wherein the retaining plate has a plurality of plate slots spaced around the periphery of the retaining plate.

42. The portable pool cue holder as described in claim 39 wherein the retaining plate has an annular ring attached thereto to guide the support assembly.

43. The portable pool cue holder as described in claim 42 wherein the annular ring has a plurality of ring slots spaced around the periphery of the annular ring.

44. The portable pool cue holder as described in claim 43 wherein the support assembly comprises a plurality of legs, each leg having a leg member and a foot portion, and a ledge formed at the junction of the leg member and the foot portion, said ledge cooperating with the ring slots in the annular ring to retain the support assembly within the hollow member when the support assembly is in a retracted position.

45. The portable pool cue holder as described in claim 43 wherein the hollow member, the hollow collar and the retaining plate are each cylindrical.

46. The portable pool cue holder as described in claim 39 wherein the hollow member and the hollow collar are both cylindrical.

47. The portable pool cue holder as described in claim 39 wherein the hollow member is cylindrical.

48. The portable pool cue holder as described in claim 39 wherein the support assembly comprises a plurality of legs.

49. The portable pool cue holder as described in claim 48 wherein the legs are attached to an assembly head adapted to be mounted within the hollow member.

50. The portable pool cue holder as described in claim 49 wherein the legs are attached to the assembly head by a pivot pin.

51. The portable pool cue holder as described in claim 50 wherein the pivot pin includes a spring that biases each leg toward an outward position.

52. The portable pool cue holder as described in claim 48 wherein each leg has a leg member and a foot portion.

53. The portable pool cue holder as described in claim 52 wherein the foot portion is joined to the leg member at an oblique angle.

54. The portable pool cue holder as described in claim 52 wherein the bottom of each foot portion is provided with a gripping surface.

55. The portable pool cue holder as described in claim 54 wherein the gripping surface is a serrated surface.

56. The portable pool cue holder as described in claim 39 wherein the support assembly is mounted within the hollow member.

57. The portable pool cue holder as described in claim 56 wherein the support assembly is movably mounted within the hollow member between a first retracted storage position and a second extended support position.

58. The portable pool cue holder as described in claim 56 wherein a cap is provided to close an end of the hollow member and retain the support assembly in the hollow member when the support assembly is in the retracted position.

59. The portable pool cue holder as described in claim 58 wherein the cap is pivotally mounted on the hollow member.

* * * * *